3,579,548
TRIGLYCERIDE ESTERS OF α-BRANCHED
CARBOXYLIC ACIDS
David D. Whyte, Wyoming, Ohio, assignor to The Procter
& Gamble Company, Cincinnati, Ohio
No Drawing. Filed May 10, 1968, Ser. No. 728,362
Int. Cl. C11c 3/02; A23d 3/00
U.S. Cl. 260—410.7                                      1 Claim

ABSTRACT OF THE DISCLOSURE

Glycerol esters of α-branched carboxylic acids have the physical properties and utility, e.g., in food compositions, of ordinary triglyceride fat but are less digested or absorbed and are thus low calorie.

BACKGROUND OF THE INVENTION

The field of this invention is edible compounds and food compositions. More specifically, the invention relates to novel fatty compounds and food compositions based on these compounds. The compounds have the physical properties of ordinary triglyceride fat but are comparatively less digested or absorbed and thus are relatively low in available calories. One of the most common metabolic problems among people today is obesity. This condition is simply due to a greater intake of calories than are expended. Fat is the most concentrated form of energy in the diet, with each gram of ordinary triglyceride fat supplying approximately 9 calories. Overall, fat constitutes about 40% of the total calories in the diet. If the available calories of a fat could be lowered without decrease in the amount eaten, this would offer a very convenient and practical method by which obesity could be prevented or overcome.

Ordinary triglycerides, i.e., glycerol triesters of primary fatty acids, such as triolein, are the main component of edible fat and constitute 90% of the total amount consumed. One method by which the caloric value of edible fat could be lowered would be to decrease the amount of triglyceride that is absorbed in the human system since the ordinary edible triglyceride fats are almost completely absorbed (see Lipids, 2, H. J. Deuel, Interscience Publishers, Inc., New York, 1955, page 215).

The absorbability of triglyceride fat could be decreased by altering either the alcohol or the fatty acid portion of the molecule. There have been some experiments that have demonstrated a decrease in absorbability with certain fatty acids; for example, erucic acid (H. J. Deuel, A.L.S. Cheng) and M. G. Morehouse, Journal Nutrition 35, 295 [1948]) and stearic acid if present as tristearin (F. H. Mattson, Journal of Nutrition 69, 338 [1959]). Some attempts to accomplish this end (decreased absorbability) have also been made by altering the alcohol moiety of edible fatty compounds, e.g., fatty acid esters of alcohols. See, for example, U.S. Pat. 2,962,419, Nov. 29, 1960, which discloses that fatty acid esters which contain a neopentyl

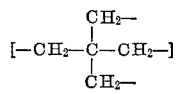

nucleus are not digested like normal fats and thus can be used as a fat substitute in food compositions. In addition, the co-pending commonly assigned application of Mattson et al., Ser. No. 723,607, filed Apr. 23, 1968, discloses low calorie food compositions based on sugar or sugar alcohol fatty acid ester containing at least four fatty acid ester groups.

One of the main problems in attempting to formulate fat compounds that have decreased absorbability and thus low calorie properties is to maintain the desirable and conventional physical properties of edible fat. Thus, to be a practical low calorie fat, a compound must resemble conventional triglyceride fat, and have the same utility in various fat-containing food compositions such as shortening, margarine, cake mixes, and the like, and be useful in frying or baking.

SUMMARY OF THE INVENTION

In accordance with the present invention, it has been discovered that glycerol esters of certain α-branched carboxylic acids have the physical properties of ordinary triglyceride fat but are not digested or absorbed to the same extent when eaten. These compounds can therefore be used as a partial or total replacement for ordinary triglyceride fat in fat-containing food compositions to reduce the caloric value thereof. More specifically, the invention provides a novel class of compounds having primary utility as edible low calorie fats, which comprise glycerol ester of α-branched carboxylic acid having the general Formula I

wherein X is an α-branched carboxylic acid residue having the Formula II

wherein $R_1$ and $R_2$ are each selected from alkyl groups of from 1 to 30 carbon atoms, and
$R_3$ is selected from hydrogen, and alkyl groups of from 1 to 30 carbon atoms, the total carbon atoms in $R_1+R_2+R_3$ being from 8 to 30; and
Y and Z are each selected from X, —OH, and

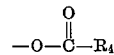

wherein $R_4$ is selected from alkyl, and alkene groups of 8 to 30 carbon atoms.

The invention also provides low calorie fat-containing food compositions wherein from about 10% to about 100% of the total fat comprises the above-specified glycerol esters of α-branched carboxylic acid.

The above-defined glycerol esters (and fat-containing food compositions containing these compounds) have desirable physical properties and palatability compared to ordinary triglyceride fat and compositions containing same, but they have a substantially lower effective caloric value because the specified glycerol esters are less digested or absorbed than ordinary triglyceride fat in the intestinal tract and hence not all of the ingested calories are available to the body. The glycerol esters of α-branched carboxylic acids per se and food compositions containing these compounds which are low in available calories are conveniently referred to herein simply as "low calorie." In addition to their primary utility as edible low calorie fats, the glycerol esters of a α-branched carboxylic acids disclosed herein are useful as lubricants, functional fluids, surface active agents, and synthetic detergent precursors.

DESCRIPTION OF THE PREFERRED EMBODIMENTS

Low calorie fatty compounds

The low calorie fatty compounds of the present invention are glycerol esters of α-branched carboxylic acids having the general Formula I

$$\begin{array}{l} H_2C-X \\ HC-Y \\ H_2C-Z \end{array} \qquad I$$

In the above general Formula I, X is an α-branched carboxylic acid residue having the general Formula II

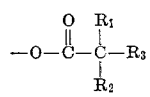

$$\begin{array}{c} O \quad R_1 \\ \| \quad | \\ -O-C-C-R_3 \\ | \\ R_2 \end{array} \qquad II$$

In the above Formula II, $R_1$ and $R_2$ are each selected from alkyl groups of from 1 to 30 carbon atoms, and $R_3$ is selected from hydrogen, and alkyl groups of from 1 to 30 carbon atoms. The total carbon atoms in $R_1$ plus $R_2$ plus $R_3$ is from 8 to 30, preferably, from 12 to 22.

Preferably, the compounds of Formula I are triglyceride esters of the α-branched carboxylic acids in which event Y and Z are each selected from X, i.e., Y and Z are also of Formula II. In preferred triglyceride esters, X, Y, and Z are selected from Formula II and are each the same. The compounds of Formula I can also be diglyceride esters of the α-branched carboxylic acids in which event one of Y and Z is X while the other is —OH. Monoglyceride esters in which Y and Z are both —OH are also contemplated herein. Alternatively, the compounds of Formula I can be mixed di- or triglyceride esters of the α-branched carboxylic acids and normal (primary) fatty acids in which event Y and/or Z is

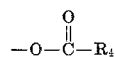

$$-O-\overset{O}{\overset{\|}{C}}-R_4$$

$R_4$ is selected from alkyl and alkene groups of 8 to 30 carbon atoms, preferably of 11 to 22 carbon atoms, and most preferably of 13 to 17 carbon atoms.

Compounds of Formula I can be prepared by esterifying glycerol with an α-branched carboxylic acid of Formula IIA.

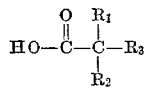

$$\begin{array}{c} O \quad R_1 \\ \| \quad | \\ HO-C-C-R_3 \\ | \\ R_2 \end{array} \qquad (IIA)$$

The α-branched carboxylic acid residue of Formula II corresponds to the acid per se of Formula IIA; thus in Formula IIA, $R_1$, $R_2$ and $R_3$ are the same as in Formula II. α-Branched chain carboxylic acids of Formula IIA are commercially available materials and are commonly referred to as neo acids, as synthetic di- and trialkylacetic acids, or as secondary carboxylic acids. See The Journal of the American Oil Chemists Society, 45, No. 1, January 1968, pages 5–10. These compounds can be prepared by the well known Koch process from olefins, carbon monoxide and water as described by H. Koch in Brennstaff Chem. 36, 321 (1955). Further details on methods for making α-branched carboxylic acids useful herein as Formula IIA compounds are found in British Pat. 960,011 and 998,974, Canadian Pat. 687,229, German Pats. 1,202,265 and 1,206,421, and U.S. Pat. 3,349,107, all incorporated herein by reference.

Preferred α-branched carboxylic acids within the scope of Formulas II and IIA are those wherein $R_3$ is hydrogen, $R_1$ and $R_2$ are each selected from alkyl groups of from 2 to 22 carbon atoms, and the total carbon atoms in $R_1+R_2$ is from 12 to 22.

α-Branced carboxylic acids are often made from olefin feedstocks which are random isomeric mixtures in regard to the position of the olefinic bond. These acids are also random isomeric mixtures in regard to the position of the α-branched chain. Such random α-branched carboxylic acids, for example, where $R_1$ and $R_2$ in Formulas II and IIA randomly vary in alkyl chain length but the total of $R_1+R_2$ remains constant from molecule to molecule, are preferred for use herein. Glycerol esters of these random α-branched carboxylic acids have desirable melting point characteristics in that they generally are liquid at room temperature and even below, i.e., they have very low freezing points. Such compounds, therefore, are particularly useful where a stable fluid shortening is desired. With ordinary triglyceride fats in the $C_{12}$–$C_{22}$ chain length range, unsaturation is usually necessary to provide a composition that is liquid over a wide temperature range, e.g., for use as a fluid salad oil or shortening. However, as is well known, unsaturation of fats can lead to oxidative instability. The glycerol esters of α-branched carboxylic acids, particularly random α-branced carboxylic acids, can provide liquid compositions without unsaturation and possess this advantage over ordinary triglyceride fats. For these same reasons, the glycerol esters of the invention have utility as low temperature lubricating fluids.

As noted above, glycerol ester compounds of Formula I can be prepared by the reaction of glycerol with a carboxylic acid of Formula IIA in a conventional esterification process. See Examples I and II, infra, for preparation of triglyceride esters. Mono- and diglyceride esters can be prepared in the same manner by reacting a measured excess of glycerol with the fatty acid. See Example III, infra and Bailey's Industrial Oil and Fat Products, third edition, pp. 952–958. Mixed glyceride esters of the α-branched carboxylic acids and primary fatty acids, wherein Y and/or Z in Formula I is

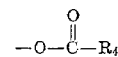

$$-O-\overset{O}{\overset{\|}{C}}-R_4$$

can be prepared by reaction of glycerol with a mixture of the α-branched carboxylic acids and primary fatty acids, by the stepwise esterification with one class of acids and then the other, or by transesterifying ordinary triglycerides, e.g., soybean oil, with an α-branched carboxylic acid ester. The glycerol ester compounds of Formula I can be prepared by a variety of other methods well known to those skilled in the art. These methods include transesterfication, or acylation of glycerol with a chloride or anhydride of an appropriate α-branched acid of Formula IIA.

In the following Examples I–IV the starting material used in preparing the specified glycerol ester was one of three random α-branched carboxylic acids having the general Formula IIA with $R_3$ being hydrogen and $R_1$ and $R_2$ each being alkyl which together totaled the indicated carbon number, e.g., $C_{19}$, $C_{13}$, or $C_{21}$. $R_1$ and $R_2$ each randomly varied from $C_1$ up to the carbon number minus 1. Analytical data on each of these acids is given below in Table 1.

TABLE 1

| Random α-branched carboxylic acid | $C_{19}$ | $C_{13}$ | $C_{21}$ |
|---|---|---|---|
| Purity (by acid value) | 98 | 98 | 97 |
| Elemental analyses, percent: | | | |
| Carbon | 77.2 | 77.6 | 78.3 |
| Hydrogen | 13.2 | 12.1 | 13.1 |
| Oxygen | 10.2 | 14.4 | 9.9 |
| Saponification value | 184 | 256 | 167 |
| Acid value | 184 | 256 | 167 |
| Iodine value | 1.4 | 0.9 | 1.7 |
| Isomer distribution by capillary vapor phase chromatography of methyl esters: | | | |
| Normal 1° | | | |
| α-Methyl 2° | 12 | 18 | 12 |
| α-Ethyl 3° | 14 | 24 | 13 |
| α-Propyl 4° | 11 | 17 | 9 |
| α-Butyl 5° | 13 | 20 | 11 |
| Higher 6°–10° | 50 | 20 | 55 |

EXAMPLE I

Triglyceride ester of $C_{13}$ random α-branched carboxylic acid 10.01 grams of the $C_{13}$ acid described above in Table 1, 1.44 grams glycerol and 0.458 gram toluene sulfonic acid (catalyst) were added to a 50 ml. glass reaction flask equipped with a magnetic stirrer and discharged through a Dry Ice trap to a vacuum pump. Reaction at 180° C. and 5¼ inches Hg pressure for 4 hours produced the desired triglyceride ester with acid value 3.8 as indicated by infrared and thin layer chromatography. The triglyceride was purified by extracting with ether, water washing, removal of acid by washing with $K_2CO_3$, slurrying with carbon bleach, filtering through $Na_2SO_4$, and drying. 5 grams of triglyceride product was obtained having an acid value of 1.1. Thin layer chromatography confirmed the structure of Formula I with X being Formula II as described above for the random α-branched $C_{13}$ acid of Formula IIA. Y and Z of Formula II were the same as X.

The triglyceride ester was liquid at room temperature and remained so after being placed on a Dry Ice block. The ester resembled oridinary $C_{13}$ triglycerides in fatty properties and can be used in place thereof to provide low calorie fat-containing food compositions.

EXAMPLE II

Triglyceride ester of $C_{21}$ random α-branched carboxylic acid 10.07 grams of the $C_{21}$ acid described above in Table 1, 0.93 gram glycerol and 0.292 gram of toluene sulfonic acid were reacted as in Example I to produce the desired triglyceride ester with acid value 54.6 as indicated by infrared and thin layer chromatography. Purification as in Example I gave 5 grams of product with acid value 12.3. Thin layer chromatography confirmed the structure of Formula I with X being Formula II as described above for the random α-branch $C_{21}$ acid of Formula IIA. Y and Z of Formula II were the same as X.

The triglyceride ester was liquid at room temperature, solidified on Dry Ice, and quickly recovered to a liquid at room temperature. The ester resembled ordinary $C_{20}$–$C_{22}$ triglycerides in fatty properties except for its liquidity at room temperature and can be used in place of conventional triglycerides to provide low calorie fat-containing food compositions.

EXAMPLE III

Monoglyceride ester of $C_{19}$ random α-branched carboxylic acid 10.0 grams of the $C_{19}$ acid described above in Table 1, 30.8 grams of glycerol, 0.4 gram $H_2SO_4$ (catalyst), and 350 grams dioxane (solvent) are heated at reflux for 12 hours with mechanical stirring. Purification yields 6 grams of monoglyceride product having the structure of Formula I with X being Formula II as described above for the random α-branched $C_{19}$ acid of Formula IIA. Y and Z of Formula II are each —OH.

EXAMPLE IV

Mixed triglyceride ester of $C_{13}$ random α-branched carboxylic acid and oleic acid Example I is repeated except that 7.3 grams of the $C_{13}$ random α-branched carboxylic acid are replaced by oleic acid. The mixed triglyceride product has Formula I with X being Formula II as described above for the $C_{13}$ random α-branched carboxylic acid of Formula IIA. Y and Z are each

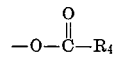

with $R_4$ being $C_{17}$ alkene, i.e.,

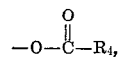

is the residue of oleic acid.

The following examples shown in Table 2 represent additional low calorie fats of Formula I.

TABLE 2
[Glycerol esters of α-branched carboxylic acids, Formula I]

| Example: | X (Formula II) | Y | Z |
|---|---|---|---|
| V | $R_1=C_9$, $R_2=C_8$, $R_3=H$ | Formula II; $R_1=C_9$, $R_2=C_8$, $R_3=H$ | $-O-\overset{O}{\underset{\|}{C}}-R_4$; $R_4=C_{17}$ alkyl |
| VI | $R_1=C_4$, $R_2=C_8$, $R_3=C_8$ | $-O\overset{O}{\underset{\|}{C}}-R_4$; $R_4=C_{17}$ alkene | $-O\overset{O}{\underset{\|}{C}}-R_4$; $R_4=C_{15}$ alkyl |
| VII | $R_1=C_2-C_{16}$ random, $R_2=C_2-C_{16}$ random, $R_1+R_2=18$, $R_3=H$ | $R_1=C_2-C_{16}$ random, $R_2=C_2-C_{16}$ random, $R_1+R_2=18$, $R_3=H$ | $R_1=C_2-C_{16}$ random, $R_2=C_2-C_{16}$ random, $R_1+R_2=18$, $R_3=H$ |
| VIII | Same as above | —OH | —OH |
| IX | do | $R_1=C_2-C_{16}$ random, $R_2=C_2-C_{16}$ random, $R_1+R_2=18$, $R_3=H$ | $-O\overset{O}{\underset{\|}{C}}-R_4$; $R_4=C_{13}-C_{17}$ mixed alkyl and alkene |
| X | $R_1=C_8$, $R_2=C_{12}$; $R_3=C_1$ | $O\overset{O}{\underset{\|}{C}}-R_4$; $R_4=C_{15}$ alkyl | $-O\overset{O}{\underset{\|}{C}}-R_4$; $R_4=C_{11}$ alkyl |
| XI | $R_1=C_2-C_{12}$ random, $R_2=C_2-C_{12}$ random, $R_1+R_2=14$, $R_3=C_1$ | —OH | $R_1=C_2-C_{12}$ random, $R_2=C_2-C_{12}$ random, $R_1+R_2=14$, $R_3=C_1$ |
| XII | Triglyceride ester of $C_{13}$ random α-branched carboxylic acid. | $-O\overset{O}{\underset{\|}{C}}-R_4$; $R_4=C_{21}$ alkyl | $-O\overset{O}{\underset{\|}{C}}-R_4$; $R_4=C_{21}$ alkyl |

Low calorie properties

The low calorie properties possessed by the glycerol esters of of α-branced carboxylic acids of this invention can be shown by a fat balance experiment from which a coefficient of absorbability is obtained. This is a conventional experiment in which rats are fed a dietary fat comprising the test material and their feces are collected. The amount of fat eaten and the amount of fat in the feces are determined. The difference between these two values is the amount of fat absorbed. The portion absorbed of the amount fed expressed as a percentage in the coefficient of absorbability and is an indication of the relative available calories of the test materials. In such a test, the glycerol esters of the present invention will exhibit a coefficient of absorbability in the range of from about 0 to about 50 compared with about 90 to about 100 for ordinary triglyceride fat, e.g., triolein. A proposed mechanism explaining the low calorie properties of the compounds of this invention is that the α-branched carboxylate structure prevents the compounds from being hydrolyzed by pancreatic juice in the enzymatic digestive process. The reduced absorbability of the compounds can be further verified by lymph cannulation tests.

Food compositions

The low calorie glycerol esters of α-branched carboxylic acids of the present invention can be used as a partial or total replacement for ordinary triglyceride fat in any fat-containing food composition to provide low calorie benefits. In order to obtain a significant low calorie effect, it is preferred that at least about 10% of the fat in the food composition comprises the low calorie glycerol ester. On the other hand, very low calorie and thus highly desirable food compositions of the invention are obtained when the fat comprises up to about 100% of the glycerol ester. Hence, the low calorie fatty compounds of the present invention can be used as partial or complete replacement for ordinary triglyceride fat in a salad or cooking oil, or a plastic shortening, for use in frying, cake making, bread making, or the like. The low calorie fats can also be used as a partial or complete replacement for ordinary triglyceride fat in fat-containing food products such as mayonnaise, margarine, and dairy products.

In order to more particularly illustrate the food composition utility of the low calorie fats of the present invention, the triglyceride ester of $C_{13}$ random α-branched carboxylic acid of Example I, supra ("$C_{13}$ ester") is shown to function as a typical salad or cooking oil in the following tests, in which it is compared to a conventional commercially available salad oil comprised of refined and lightly hydrogenated soybean oil (triglycerides of soybean oil fatty acids).

Smoke point: The smoke point of $C_{13}$ ester is compared to that of the conventional oil. The $C_{13}$ ester has a smoke point of about 450° F. as compared to 466° F. for the conventional oil.

Pan frying tests: Two electric Teflon-coated 10-inch skillets are used for these tests. 200 grams of oil is added to the skillet for the fish and meat test. 30 grams of oil is added for the egg frying test. Temperature for frying is that recommended by the skillet manufacturer for each type of food. The $C_{13}$ ester performs satisfactorily in each of the pan frying tests.

Eggs—no differences in color or flavor can be detected between the eggs fried in the $C_{13}$ ester and those fried in the conventional oil.

Beefsteaks—the $C_{13}$ esters performed as well as the conventional oil. No differences in color or flavor are detected.

Breaded shrimp—the products fried in the $C_{13}$ ester are similar to those fried in conventional oil and are acceptable to a taste panel.

Breaded codfish steaks—the $C_{13}$ ester performs as well as the conventional oil. A taste panel cannot detect any differences.

Deep fat frying: Potato pieces are fried at 375° F. in the $C_{13}$ ester and conventional oil. The $C_{13}$ ester functions satisfactorily as a deep frying oil. Panelists judge the products fried in the conventional oil to have an equivalent flavor and color.

Cakes: High ratio white cakes are prepared using the $C_{13}$ ester, the conventional salad oil, or cottonseed oil as the shortening base. To each base oil is added an emulsification system comprising 14% propylene glycol monostearate and 2.0% stearic acid. (See U.S. Pat. 3,145,108.) The cakes have the following formula:

| Ingredients: | Weight (grams) |
|---|---|
| Sugar | 133 |
| Flour | 107 |
| Shortening | 47.5 |
| Double-acting baking powder | 6.7 |
| Milk | 130 |
| Egg whites | 60 |
| Vanilla | 2.5 |

Examination of the cakes indicates that those utilizing the $C_{13}$ ester as a shortening base are substantially equivalent to those based on conventional soybean salad oil or cottonseed oil.

Bread: The $C_{13}$ ester is substituted for conventional vegetable shortening in normal white bread at an equal weight. Bread prepared with the conventional vegetable shortening is run as a control. The experimental dough containing the $C_{13}$ ester is similar to the control in dough handling properties and firming rate of the finished products. A taste panel indicates that there is very little difference in flavor detected with the $C_{13}$ ester as compared with the vegetable shortening-based bread. The bread formula is as follows:

| Ingredients: | Weight (grams) |
|---|---|
| Flour | 808 |
| Wheat starch | 146 |
| Water | 566 |
| Yeast (dry) | 35 |
| Shortening | 58 |
| Sucrose | 55 |
| Nonfat milk solids | 38 |
| Salt | 25 |

Mayonnaise: The $C_{13}$ ester, conventional soybean salad oil, and cottonseed oil, are compared in a conventional mayonnaise recipe of the following formula:

| Ingredients: | Weight (grams) |
|---|---|
| Egg yolk | 8.0 |
| Vinegar | 11.0 |
| Sugar | 2.0 |
| Salt | 1.3 |
| Oil | 77.7 |

The $C_{13}$ ester produces a mayonnaise having an equivalent taste when compared to that prepared with cottonseed or soybean oil.

Plastic Shortening: 100 grams samples of commercially available conventional plastic shortening, and $C_{13}$ ester plus 10% hardstock (tristearin) are each melted and plasticized using a laboratory chiller. The samples each form plastic fats.

EXAMPLES XIII–XIX

The following examples further illustrate low calorie fat-containing food compositions wherein from about 10% to about 100% of the fat comprises a glycerol ester of α-branched carboxylic acid of the present invention.

EXAMPLE XIII.—SALAD OILS (A)

| Ingredients: | Percent by weight |
|---|---|
| Refined, bleached, and lightly hydrogenated soybean oil | 50 |
| Triglyceride ester of Example II | 50 |
| | 100 |

(B)

| Ingredients: | Percent by weight |
|---|---|
| Refined cottonseed oil | 90 |
| Mixed triglyceride ester of Example V | 10 |
| | 100 |

(C)

| Ingredients: | Percent by weight |
|---|---|
| Mixed triglyceride ester of Example VI | 100 |

(D)

| Ingredients: | Percent by weight |
|---|---|
| Triglyceride ester of Example VII | 100 |

9

(E)

| Ingredients: | Percent by weight |
|---|---|
| 50/50 blend of cottonseed oil and soybean oil | 50 |
| Olive oil | 25 |
| Monoglyceride ester of Example VIII | 25 |
| | 100 |

EXAMPLLE XIV.—PLASTIC SHORTENING (A)

| Ingredients: | Percent by weight |
|---|---|
| Lightly hydrogenated soybean oil (I.V. 107) | 50 |
| Diglyceride ester of Example XI | 40 |
| Tristearin (hardstock, I.V. 8) | 10 |
| | 100 |

(B)

| Ingredients: | Percent by weight |
|---|---|
| 50/50 mixture of hardened cottonseed oil and lard | 40 |
| Monoglycerides of soybean oil | 10 |
| Mixed triglyceride ester of Example XII | 50 |
| | 100 |

EXAMPLE XV.—PREPARED CAKE MIX (a) Specific

| Ingredients: | Percent by weight |
|---|---|
| Cake flour | 36 |
| Sugar | 44 |
| Shortening (triglyceride ester of Example I) | 13 |
| Nonfat dried milk solids | 4 |
| Leavening | 2 |
| Salt | 1 |
| | 100 |

(b) General

| Ingredients: | Percent by weight |
|---|---|
| Sugar | 35–50 |
| Flour | 25–50 |
| Shortening (10%–100% glycerol ester of Formula I) | 5–30 |
| Leavening | 1–4 |
| Cocoa | 0–7 |
| Egg | 0–5 |
| Milk solids | 0–5 |
| Flavor | 0–5 |
| | 100 |

EXAMPLE XVI.—PREPARED ICING MIX

| Ingredients: | Percent by weight |
|---|---|
| Shortening (50/50 mixture conventional vegetable shortening and triglyceride ester of Example II) | 20 |
| Salt | 2 |
| Nonaft dry milk solids | 5 |
| Sugar | 73 |
| | 100 |

EXAMPLE XVII.—MAYONNAISE

| Ingredients: | Percent by weight |
|---|---|
| Fat (75/25 blend of mixed triglyceride ester of Example IV and refined cottonseed oil) | 75 |
| Vinegar | 10 |
| Egg yolk | 9 |
| Sugar | 3 |
| Salt | 1 |
| Mustard | 1 |
| Flavor | 1 |
| | 100 |

EXAMPLE XVIII.—SALAD DRESSING

| Ingredients: | Percent by weight |
|---|---|
| Fat (triglyceride ester of Example II) | 50 |
| Cornstarch | 5 |
| Vinegar | 10 |
| Water | 35 |
| | 100 |

EXAMPLE XIX.—MARGARINE

| Ingredients: | Percent by weight |
|---|---|
| Oil (8:1 mixture of triglyceride ester of Example I and triglyceride ester of Example VII) | 80 |
| Milk solids | 2 |
| Salt | 2 |
| Monoglyceride ester of Example VIII | 15 |
| Water | 1 |
| | 100 |

As exemplified above, a wide variety of low calorie fat-containing food compositions can be prepared from glycerol esters of α-branched carboxylic acids disclosed herein. Preferred food compositions are those selected from the group consisting of salad oil, plastic shortening, bread, prepared culinary mixes (e.g., for cakes, icings, and the like), mayonnaise, and margarine.

What is claimed is:

1. Glycerol ester of α-branched carboxylic acid having the general formula

I wherein X is an α-branched carboxylic acid residue having the Formula II

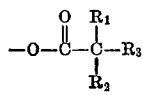

II wherein $R_1$ and $R_2$ are each selected from the alkyl groups of from 1 to 30 carbon atoms, and $R_3$ is selected from hydrogen, and alkyl groups of from 1 to 30 carbon atoms, and the total carbon atoms in $R_1+R_2+R_3$ being from 8 to 30.

References Cited

FOREIGN PATENTS 946,432   1/1964   Great Britain.

LEWIS GOTTS, Primary Examiner

D. G. RIVERS, Assistant Examiner

U.S. Cl. X.R.

99—90, 94, 118, 122, 139, 144; 252—56